Jan. 27, 1970        T. F. GRIFFETH        3,491,595
TEMPERATURE COMPENSATED CONDUCTIVITY TESTER
Filed Nov. 4, 1966        2 Sheets-Sheet 2
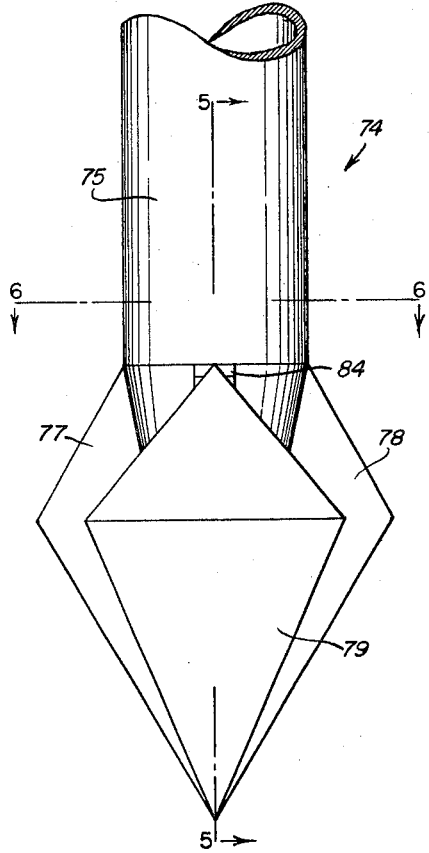
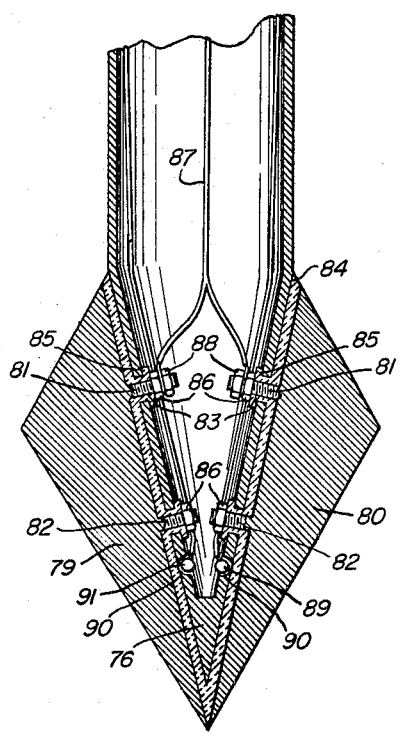
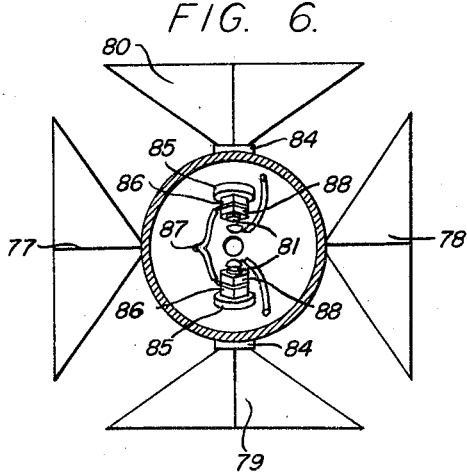
INVENTOR:
THURMAN F. GRIFFETH.
BY:
MALLINCKRODT & MALLINCKRODT
ATTORNEYS

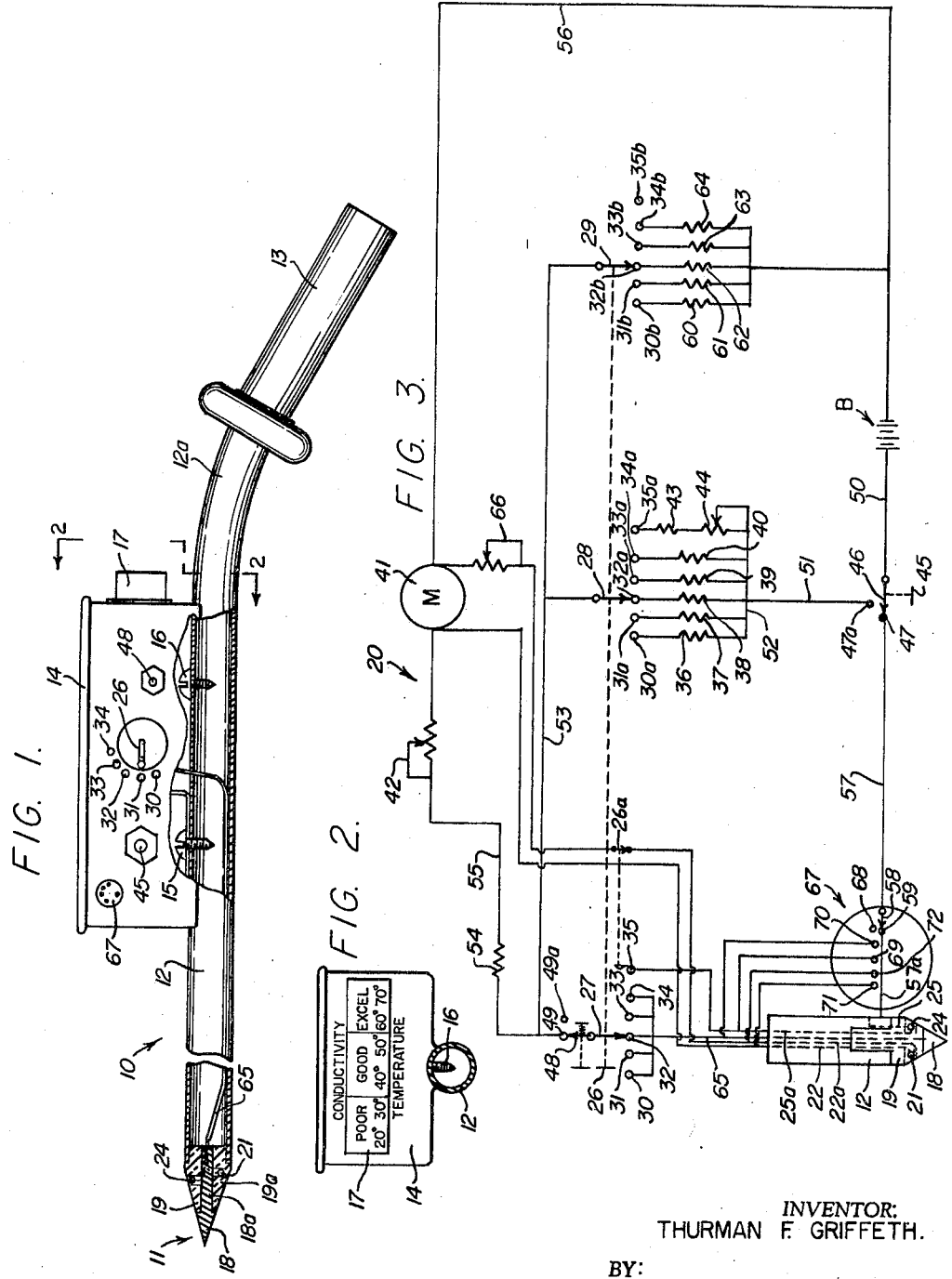

United States Patent Office 3,491,595
Patented Jan. 27, 1970

3,491,595
TEMPERATURE COMPENSATED CONDUCTIVITY TESTER
Thurman F. Griffeth, P.O. Box 248,
Preston, Idaho 83263
Filed Nov. 4, 1966, Ser. No. 592,047
Int. Cl. G01k 1/08
U.S. Cl. 73—344                    5 Claims

ABSTRACT OF THE DISCLOSURE

An electrical resistance device for determining the moisture content of soils and other unconsolidated solids, including a temperature-responsive resistance so that the temperature of the material being tested is obtainable at the point where the test is made and the conductivity reading is automatically corrected in accordance with the temperature of the material.

GENERAL DESCRIPTION

This invention relates to apparatus for determining the temperature and moisture content of soils and the like.

It has long been recognized as desirable to have a device capable of being used quickly and easily in the field to determine the moisture content of soils, stored crops, etc. and for this purpose a number of devices have been heretofore proposed. U.S. Patent No. 2,437,134, for example, shows one instrument used for determining the moisture content of soils.

So far as I am aware there has not heretofore been developed an instrument that is entirely satisfactory and that will provide temperature readings of the soil being tested at a desired depth, as well as a temperature compensated conductivity reading indicative of the moisture content of the soil. The temperature reading is highly valuable as an aid in determining whether or not the soil is ready for a crop planting and unless the conductivity reading is corrected for temperature it can be sufficiently in error that crop damage may result from the failure to irrigate, as required.

It is a principal object of the present invention to provide a compact and simply operated instrument that will provide temperature data to a user, as well as temperature compensated conductivity measurements for any of the commonly encountered soil conditions.

To accomplish this object I provide a lightweight, cane-shaped probe that can be readily inserted into the ground, a meter calibrated to read either temperature or conductivity, and a circuit including both spaced electrodes and temperature sensing elements therein. One of the temperature sensing elements is connected in the circuit to provide a direct indication of soil temperature adjacent the probe tip and another is connected in the circuit to provide a compensating means for the conductivity reading made at the probe tip. A selector circuit is employed to insure accurate readings regardless of the type of soil encountered.

There are shown in the accompanying drawings specific embodiments of the invention representing what are presently regarded as the best modes of carrying out the generic concepts in actual practice. From the detailed description of these presently preferred forms of the invention, other more specific objects and features will become apparent.

In the drawings:

FIG. 1 is a side elevation of a preferred form of probe in accordance with the invention, the probe housing being partially broken away to show components contained therein;

FIG. 2, a vertical section taken on the linen 2—2 of FIG. 1;

FIG. 3, a diagram of a preferred circuit;

FIG. 4, an enlarged fragmentary side elevation view of another form of probe tip;

FIG. 5, a vertical section view taken on the line 5—5 of FIG. 4; and

FIG. 6, a horizontal section taken on the line 6—6 of FIG. 4.

Referring now to the drawings:

As illustrated in FIGS. 1 and 2, the soil moisture tester of the invention includes a probe 10 that is of generally cane shape, with a pointed tip 11 and an intermediate tubular body 12 that curves into a handle 12a. A non-conductive gripping member 13 is telescoped onto handle 12a to provide a convenient means for grasping the handle as the instrument is operated. A control box 14 is mounted on the probe by means of sheet metal screws 15 and 16 and a meter dial 17 is provided on the end of the control box nearest handle 12a where it can be easily observed by a user.

Tip 11 is made up of a conductive, conical member 18 that has a shank 18a press-fitted within and through a non-conductive bushing 19.

Bushing 19 is tightly press-fitted into the lower end of tubular body 12 and has a tapered exterior surface 19a that forms a continuation of the conical surface of member 18. The member 18 and the tubular body 12 serve as electrodes in the circuit, shown in a preferred form at 20, FIG. 3, employed with the invention, and bushing 19 maintains the electrodes separated.

A thermistor 21 has its responsive surface positioned inside bushing 19, closely adjacent to the exterior surface 19a. Lead wires 22 and 22a extend from the thermistor 21 through the member 19 and tubular body 12 to be connected into circuit 20. Another thermistor, shown at 24 is similarly positioned in bushing 19 and one of its lead wires 25 is connected to the conductive, tubular body 12 and its other lead wire 25a is passed through tubular body 12 to be connected into circuit 20.

The thermistors are connected into circuit 20 such that thermistor 24 will provide a reading on the meter dial 17 indicative of the temperature at the tip and thermistor 21 will compensate for temperature at the tip in the portion of the circuit including conductive member 18 and tubular body 12 as electrodes.

As is best seen in FIG. 3, power for the circuit 20 is supplied from a battery B. A selector switch 26 is adapted to be manually moved to complete circuits through its switch blades 27, 28 and 29, depending upon the type of soil concerned.

A series of contacts 30–35 are positioned to be contacted by switch blade 27; a series of contacts 30a–35a are adapted to be contacted by switch blade 28; and a series of contacts 30b–35b are provided to be contacted by switch blade 29.

The contacts 30a–34a are respectively connected in series with resistors 36–40 that are used to calibrate meter 41 FIG. 3, (housed in box 14 and presenting dial 17) to read within the conductivity range of the particular soil or other material being tested. Each resistor 36–40 is selected to correspond to the known resistance of a particular type of soil or other test material under conditions of a predetermined maximum moisture content and a variable resistor 42 is adjusted to position the indicator (not shown) of dial 17 to correspond to the desired meter reading for such moisture content, usually the maximum reading on dial 17.

For temperature compensation to adjust to any particular thermistor used, contact 35a is connected in series with a fixed resistor 43 and a variable resistor 44 that can be adjusted to provide a total resistance just equal to the resistance of thermistor 24, at a known temperature, which preferably is the maximum temperature reading on dial 17. Thus, when a circuit is completed through contact 35a and the meter, variable resistor 44 can be set to position the indicator of dial 17 at the known temperature.

Meter 41, therefore, is readily calibrated to provide accurate readings of temperature and of conductivity of any material into which tip 11 is inserted at the existing temperature. In use, the device can be set to give temperature readings or moisture readings based on conductivity.

In operation, switch 26 will normally be positioned in accordance with the type of reading to be obtained. If, for example, a reading of the temperature at the tip 11 is desired, switch 26 will be positioned to place switch blades 27, 28, and 29 in engagement with contacts 35, 35a and 35b, respectively. As blade 27 engages contact 35, a switch 26a is opened to break the circuit through lead 22a. Thus, thermistor 21 will have no compensating effect as the soil temperature is determined.

For meter calibrating purposes switch 45 is actuated to move switch blade 46 from contact 47 to contact 47a and switch blade 48 is moved from contact 49 to contact 49a. A circuit is then completed from battery B through line 50, switch blade 46, lines 51 and 52, resistors 44 and 43, contact 35a, switch blade 28, line 53, limit resistor 54 and line 55, variable resistor 42, meter 41 and line 56 to the battery. As previously indicated, variable resistor 42 is operated to calibrate the meter.

Switch 45 is then operated to move switch blade 46 into engagement with contact 47, and switch 48 is operated to move its switch blade into engagement with contact 49.

When switch 26 is positioned for temperature reading from dial 17, as explained above, the circuit completed through meter 41 is from battery B through line 50, switch blade 46, contact 47, line 57, a switch blade 58 and contact 59, line 57a, the casing of tubular body 12, lead line 25, thermistor 24, lead line 25a, contact 35, switch blade 27, switch blade 48, limit resistor 54, line 55, variable resistor 42, meter 41 and line 56 to the battery.

To determine conductivity of the material being tested, switch 26 is operated to position blades 27, 28, and 29 in engagement with their respective contacts corresponding to the resistances selected for the material to be tested. If, for example, the conductivity of loam soil is to be determined, the switch 26 is moved to place blades 27, 28, and 29, respectively, in engagement with contacts 32, 32a, and 32b.

The meter 41 is then calibrated for the soil being tested by actuating switch 45 to place blade 46 in engagement with contact 47a and by adjustment of variable resistor 42. The completed calibration circuit then is from battery B, through line 50, switch blade 46, contact 47a, resistor 38, contact 32a, switch blade 28, line 53, limit resistor 54, line 55, variable resistor 42, meter 41, and line 56. Resistors 60–64 are respectively connected in series with contacts 30b–34b and are connected to lines 53 and 56 that are in series with meter 41, selectively, in accordance with the position of switch blade 29. With the switch 26 positioned to test loam soil blade 29 is in engagement with contact 32b and the voltage drop across the meter is determined by resistor 62. After the meter has been calibrated, by the positioning of variable resistor 42, in the manner previously described, the instrument is ready to determine the conductivity of the loam soil to be tested and the tip 11 is inserted to the desired depth.

Switch blade 46 of switch 45 is moved to contact 47 and switch 49 is operated to complete the circuit through the tip. The completed circuit then is from battery B, through line 50, switch blade 46, contact 47, line 57, switch blade 58, contact 59, line 57a, the conductive tubing 12, the soil being tested, tip 18, line 65, switch blade 27, switch blade 48, limit resistor 54, line 55, variable resistor 42, meter 41 and line 56 to the battery.

The standard voltage drop through resistor 62 insures a reading compatible with the scale 17 of meter 41, and the voltage drop through line 22, thermistor 21, and line 22a, which varies in accordance with the temperature at the tip, provides a correction for the varying resistances of materials tested due to temperature changes. Without such temperature correction errors as great as eight percent have been observed in meter readings.

Variable resistor 66 in line 22a provides a means for standardizing the thermistor 21.

It has also been found desirable to be able to use the circuit and meter above described wtih a remotely positioned tip. For this purpose the instrument is provided with a jack socket 67 that includes the switch blade 58. Insertion of a plug (not shown) connected to a remote tip (not shown) into socket 67 will move switch blade 58 to break line 57 and to place the casing of the remote tip in circuit with battery B through contact 68. A temperature sensing thermistor in the remote tip is then also connected to line 25a through contact 69, the test circuit though the remote tip is completed through contact 70 that is connected to line 65 and the compensating thermistor of the remote tip is connected to lead lines 22 and 22a through contacts 71 and 72, respectively.

In FIGS. 4–6 I show a flow through type of probe tip 74 that has proven very satisfactory, and that is especially useful in determining the conductivity of loose soils and other unconsolidated solids or semi-solids such as shelled grain.

In this embodiment, the tubular housing 75 is also of conductive material and is tapered at its lower end to receive a conductive conical point 76.

A pair of conductive vanes 77 and 78 are fixed to opposite sides of the tip, as by welding. Each of the vanes expands outwardly from a substantial line contact with the tubular housing and the point, with the width increasing to a maximum above the mid-point of the vanes.

Another pair of similarly shaped, conductive vanes 79 and 80 are positioned opposite one another and with vanes 77 and 78, divide the tip into quadrants. Vanes 79 and 80 each include upper and lower, threaded posts 81 and 82, respectively that are inserted through sleeved holes 83 in an insulator member 84 that separates the vanes 79 and 80 from the tubular body housing 75 and the point 76.

Spacers 85 surround the ends of posts 81 and 82 and prevent nuts 86, threaded onto the posts from making electrical contact with the tubular housing or point. A line 87, corresponding to the line 65 in the embodiment of FIGS. 1–3, is electrically connected to each of the posts 81 by a nut 88 and then passes out through the probe housing to be connected into a circuit, such as that shown at 20, FIG. 3.

In use, probe tip 74 is thrust into the material to be tested, in the same manner as is probe tip 11, previously disclosed. As the vanes pass through the material the test circuit is completed from vanes 77 and 78 to vanes 79 and 80 and since loose material is somewhat consolidated as it passes between the enlarged portions of the adjacent vanes a more accurate reading can be obtained.

While the temperature sensing elements of this invention have been disclosed as being thermistors, it should be obvious that other temperature responsive devices employing bi-metallic elements, gases, liquids, etc. could also be used in the circuit as resistance elements that vary with change in temperature.

When these are used, however, they should be connected in series with the meter instead of in parallel with the meter as is shown for the thermistor 21.

Whereas there are here illustrated and specifically described certain preferred constructions of apparatus which are presently regarded as the best modes of carrying out the invention, it should be understood that various changes may be made and other constructions adopted.

I claim:
1. An instrument for determining conductivity of soil and the like, comprising a cane-shaped housing having gripping means at its upper end and a tip, including a point, at its lower end; a meter having a scale for reading electrical conductivity; a temperature-responsive resistance means and a pair of electrodes at said tip; and circuit means electrically interconnecting the electrodes with the meter so as to give a reading of electrical conductivity when said tip is pushed into the soil or other material to be tested, said temperature-responsive resistance means being connected in said circuit means to compensate for temperature effects.

2. An instrument according to claim 1, wherein a second temperature-responsive resistance means is positioned at the tip and has a circuit interconnection with said circuit means, the meter including an additional scale reading in degrees of temperature; and wherein switch means are provided in said circuit means for selectively connecting either said second temperature-responsive resistance means or the temperature-compensating thermistor and the electrodes into circuit with said meter, depending upon whether it is desired to read temperature of the material or temperature-compensated conductivity.

3. An instrument according to claim 1, wherein means for consolidating loose materials is provided at the tip, said means including a plurality of vanes radiating from the housing and forming the said electrodes, the vanes forming continuations of a point on the tip and converging toward one another as they extend away from the housing and the tip.

4. In a device for measuring the conductivity of a material, a conductivity probe having spaced electrodes; temperature-responsive resistance means carried by said probe in proximity to said electrodes; electrical circuit means including said electrodes and a meter, said temperature-responsive resistance means being connected in parallel circuit with the electrodes of the probe and with the meter, so that said temperature-responsive resistance means will compensate for temperature effects; said meter being responsive to electrical current flowing through said circuit and having a scale reading in terms of conductivity, whereby the meter reading is a function of temperature-compensated conductivity.

5. A combination according to claim 4, wherein the temperature-responsive resistance means is a thermistor.

References Cited

UNITED STATES PATENTS

| 2,328,853 | 9/1943 | Sherrard | 324—65 |
| 2,437,134 | 3/1948 | Smith | 324—65 |
| 2,553,754 | 5/1951 | Dietert et al. | 324—65 |
| 2,759,148 | 8/1956 | Store | 324—65 |
| 2,906,952 | 9/1959 | Horecky | 324—65 |
| 3,141,129 | 7/1964 | Dietert | 324—65 |
| 3,207,981 | 9/1965 | Marsh et al. | 324—65 |
| 3,040,251 | 6/1962 | Dietert et al. | 324—65 |

LOUIS R. PRINCE, Primary Examiner

F. SHOON, Assistant Examiner

U.S. Cl. X.R.

324—65